United States Patent [19]
Takahashi

[11] Patent Number: 5,301,604
[45] Date of Patent: Apr. 12, 1994

[54] REDUCED-PRESSURE FRYER MACHINE

[76] Inventor: Kazuo Takahashi, No. 38-22, Kitazawa 5-chome, Setagaya-ku, Tokyo, Japan

[21] Appl. No.: 97,229

[22] Filed: Jul. 27, 1993

[30] Foreign Application Priority Data

Nov. 4, 1992 [JP] Japan .................. 4-319338

[51] Int. Cl.⁵ .............................................. A47J 37/12
[52] U.S. Cl. ...................................... 99/407; 99/330; 99/410; 99/443 C; 99/472
[58] Field of Search .......... 99/330, 331, 336, 403–418, 99/443 C, 450, 472; 126/391; 134/126, 134, 83; 426/417, 438, 231; 210/464–469

[56] References Cited

U.S. PATENT DOCUMENTS

| | | | |
|---|---|---|---|
| 2,244,168 | 6/1941 | Miller | 99/407 |
| 3,078,786 | 2/1963 | Arvan | 99/407 |
| 3,274,920 | 9/1966 | Benson | 99/404 |
| 3,296,954 | 1/1967 | Haub et al. | 99/404 |
| 3,364,845 | 1/1968 | Wilson et al. | 99/336 |
| 3,505,072 | 4/1970 | Rullman | 99/336 |
| 3,690,246 | 9/1972 | Guthrie, Sr. | 99/410 |
| 3,821,925 | 7/1974 | Moore | 99/327 |
| 4,489,647 | 12/1984 | Stamps et al. | 99/356 X |
| 4,502,372 | 3/1985 | Mariotti | 99/330 |
| 4,719,850 | 1/1988 | Sowell | 99/404 |
| 5,185,168 | 2/1993 | Takahashi | 426/233 |

FOREIGN PATENT DOCUMENTS

| | | | |
|---|---|---|---|
| 2653000 | 4/1991 | France | 99/407 |
| 1-185225 | 7/1989 | Japan | 99/407 |

Primary Examiner—Timothy F. Simone
Attorney, Agent, or Firm—Oblon, Spivak, McClelland, Maier & Neustadt

[57] ABSTRACT

A reduced-pressure fryer machine adapted to fry a food material in a food container case by immersing same in heated oil in a reduced-pressure frying vessel, the food container case being constituted by an open-topped container body substantially unperforated except its bottom side and a substantially unperforated lid for opening and closing the open top side of the container body.

4 Claims, 3 Drawing Sheets

REDUCED-PRESSURE FRYER MACHINE

BACKGROUND OF THE INVENTION

1. Field of the Invention

This invention relates to a batchwise reduced-pressure fryer machine of the sort employing a food container case for holding therein various food products to be fried, including vegetables, fruits, sea foods and livestock products as well as moldings or shaped products of these food stuff in the form of slices or chips, sticks, cubes or other arbitrary shapes, the food container case being designed to be immersed in heated oil of a reduced-pressure frying vessel to let the food product in the case undergo a predetermined frying process, and more particularly to a reduced-pressure fryer machine employing an improved food container case which is arranged to prevent the individual pieces of the food product in the case from abruptly floating up and sticking to a lid of the case or from sticking to each other to form larger lumps.

2. Description of the Prior Art

The reduced-pressure fryer machine of this sort generally includes a frying vessel, which is connected to a vacuum pump, and a food container case in the form of a metal wire basket or a box of punched or perforated metal sheet. The food container case which is filled, for example, with a predetermined amount of sliced food material is introduced into a frying vessel and immersed in heated oil for a preset time period under reduced pressure condition to fry the food material in the case.

In such a reduced-pressure fryer machine, however, it is often experienced that, when heated under reduced pressure, the food material in the case releases a great deal of steam vigorously for a certain time period in an initial stage of a frying process, and the released steam climbs up within the case and gushes out through the perforations in the lid toward the oil surface. The released steam is then discharged from the frying vessel by the action of the vacuum pump. Partly because of the energy of the vigorously climbing steam and partly because of the buoyancy of the food product itself, the individual pieces of the sliced food material in the case are urged to float up altogether and as a result forcibly pushed against the lid of the case, giving rise to problems such as adhesion of the sliced food material on the lid or agglomeration of the chips which will adversely affect the quality of the ultimate products.

Therefore, there have been proposed various countermeasures in this regard, for example, a method of supporting the food container case on a wag frame which is vertically shaken in the oil during a frying operation, or a method of repeatedly moving the food container case into and out of the oil for a few minutes before immersing the case in a still state in the oil. The first-mentioned method has a problem in that it is extremely difficult to disperse the sliced food material without adhesion or agglomeration because the whole content of the case tends to float up under the influence of great buoyancy as soon as the case is immersed and shaken up and down in the oil. This tendency is observed more conspicuously especially with a larger content of the processing food material. The second one of the above-mentioned methods also has drawbacks in that the vertical movements of the container case into and out of the oil in the course of a frying operation normally result in an inferior heating efficiency due to intermittent heating and an elongated processing time, in addition to the difficulty of giving a finish of a soft-and-full touch to the products and degradations in yield due to breakage losses of the products taking place while the case is moved up and down over a large stroke.

The above-mentioned phenomenon of the food material being pressed against and sticking on the lid of the food container case in the course of a frying operation as well as the phenomenon of the food material sticking together and agglomerating into lumps is considered to be mainly attributable to the construction of the food container case itself. Namely, normally the steam which is released from the food material in the frying process tends to climb straight upward. Therefore, it is presumable that, in a conventional food container case which is formed with a multitude of pores or perforations, the released steam from the food material vigorously flows out of the case toward the oil surface through the lid on the top side of the case, causing the food material to float up all of a sudden under the influence of the energy of the climbing steam and the buoyancy of the food material itself, and pressing the food material strongly against the lower surface of the lid in multiple overlapped layers until they completely block the perforations in the lid. As soon as the lid perforations are blocked by the food material being fried, the climbing steam which is now unable to flow out smoothly through the lid tends to find flow passages through side walls of the case. In such situations, the steam once flows upward to hit against the food material and then turns into sideward directions, leaving the food material still stuck on the lid of the food container case.

Therefore, it is conceivable that the above-mentioned problems of the conventional food container cases could be eliminated by providing a case which is constructed to control the climbing steam flows in such a way as to let part of steam linger in an upper portion of the case and form there a buffering steam layer with a cushioning effect on the food material being hit against the lid of the case, while letting the remainder of the steam form irregular sinuous flows within the container case to encourage convectional flows of the heated oil. The above-mentioned steam layer, coupled with the stirring action on the food material by the convectional heated oil flows, is considered to contribute to the eliminate the above-mentioned problematic phenomena, i.e., the adhesion of food material on the case lid and the agglomeration of food material into lumps.

SUMMARY OF THE INVENTION

It is an object of the present invention to provide a food container case for use on a batchwise reduced-pressure fryer machine, the food container case being constructed to let part of steam, released from the food material in the course of a frying process in heated oil within a reduced-pressure frying vessel, remain in an upper portion of the case to form a buffering layer there while letting the remainder of the released steam flow in an irregularly sinuous manner within the case to induce convectional flows of the heated oil.

According to the present invention, in order to achieve the above-stated objective, there is provided a reduced-pressure fryer machine including a food container case suitable for holding therein food material in the form of chips or slices, sticks, cubes or other arbitrary shapes, a reduced-pressure frying vessel arranged to immerse the container case in heated oil to fry the food material under reduced pressure, and a pressure reduction means for reducing the pressure within the frying vessel, characterized in that the food container case comprises: an open-topped box-like container body constituted by substantially unperforated walls on each side except the bottom side thereof, and a substantially unperforated lid adapted to cover and uncover the open top side of the container body.

In a frying operation using the above-described food container case, the steam which is released from the food material climbs up within the container case. However, since the container case is substantially in an unperforated state except its bottom side, the climbing steam cannot find its way out through the lidded top side and the unperforated side walls of the case and as a result part of the steam remains and forms a steam layer in an upper portion of the case while the remainder of the steam leaves the container case through the porous bottom wall after forming irregular sinuous convectional flows in all directions of the case. At this time, the steam flows provoke convectional flows of the heated oil to agitate the food material being fried. As a consequence, by the combined actions of the steam layer above the oil surface and the convectional flows of the heated oil, the food material which has been heated and softened into a relatively sticky state is suitably prevented from adhering on the lid of the case or from agglomerating into larger lumps. Besides, the convectional flows of the heated oil contribute to keep the oil temperature in the frying vessel uniform and at the same time to urge circulation of the heated oil between the individual pieces of the food material for uniform contact therewith, that is to say, for uniform heating to prevent underfrying of the food material in certain localities of the case.

In a preferred embodiment of the present invention, a lid for the food container case is provided within the frying vessel and operated by means of a lid operating means to open and close the top side of the case, and a case holder frame for the container case body is vertically movably provided within the frying vessel in association with a lift means, loading and unloading the food container body alone into and out of the frying vessel through an opening in each frying operation.

The lid for the above-mentioned food container case is preferably provided with at least grooves or small holes for dripping of oil from the top surface of the lid.

Further, the container case body and the lid of the above-mentioned food container case may be provided with a tetrafluoroethylene coating on the inner surfaces thereof.

DESCRIPTION OF PREFERRED EMBODIMENTS

Figure 1:
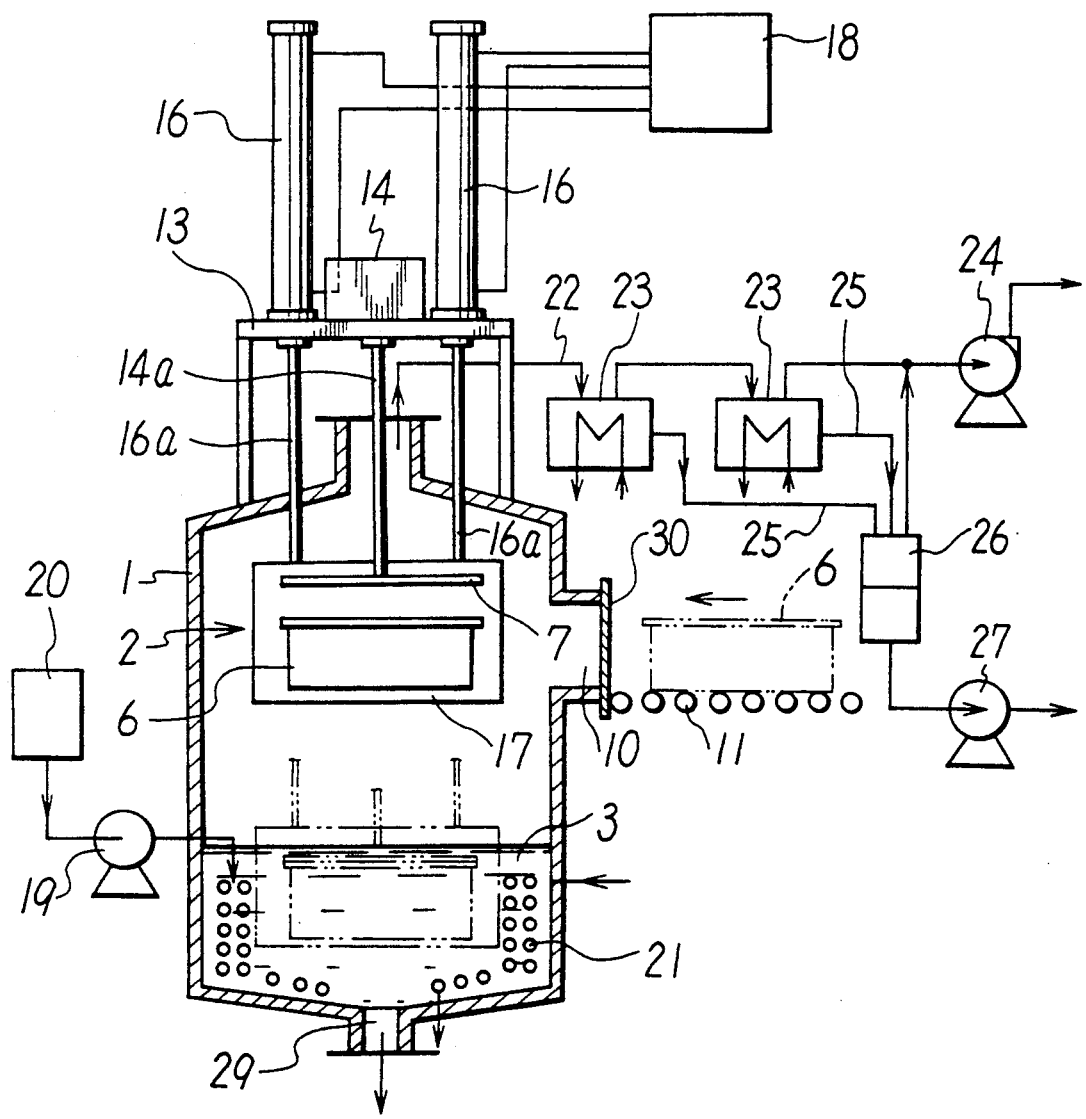
FIG. 1 is a sectional view of an embodiment of the reduced-pressure fryer machine according to the present invention.

Hereafter, the reduced-pressure fryer machine of the present invention is described more particularly by way of its preferred embodiments with reference to the accompanying drawings. Referring to FIG. 1, there is illustrated a reduced-pressure fryer including a frying vessel 1 and a food container case 2 which holds therein various food materials to be fried, including vegetables, fruits, sea foods and live-stock products as well as molded or shaped products of these food stuff in the form of slices or chips, sticks, cubes or other arbitrary shapes. The food container case 2 is immersed in heated oil 3 in a frying vessel 1 under reduced pressure to fry the food material in the case 2.

Figure 2:
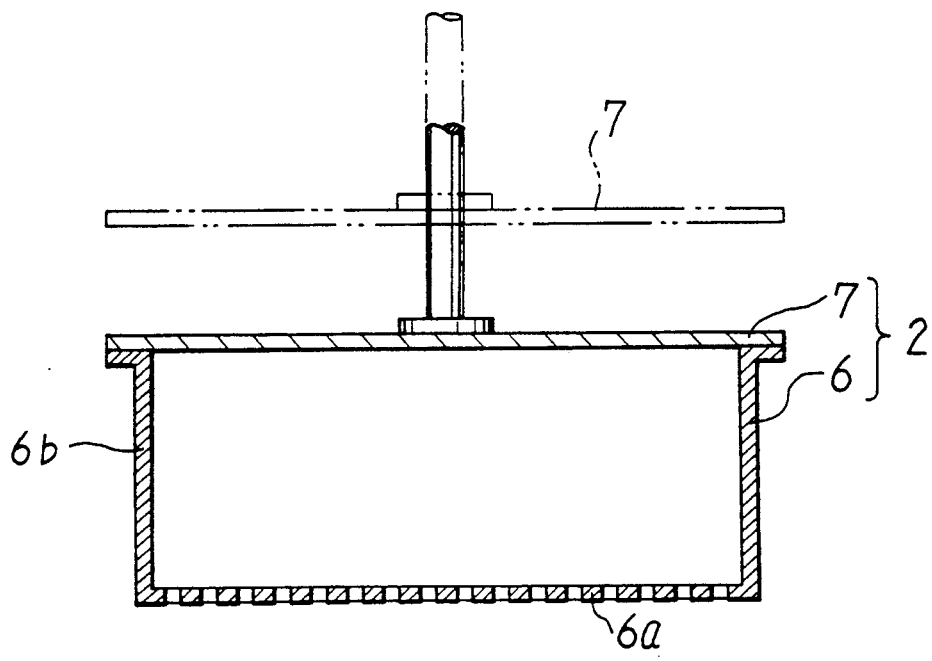
FIG. 2 is an enlarged sectional view of a food container case.

As seen in FIG. 2, the food container case 2 is composed of a rectangular box-like container case body 6 which is open on the top side, and a lid 7 which covers the top side of the container case body 6. The bottom wall 6a of the container case body 2 is formed of metal wire mesh or punching metal or other perforated metal sheet, while the side walls 6b and the lid 7 are each formed of a solid or substantially unperforated metal sheet. These container case body 6 and the lid 7 are preferred to have at least their inner surfaces coated with a synthetic resin like tetrafluoroethylene which has heat- and oil-resistant properties along with unsticking properties for the food material to be fried in the container case.

The container body 6 of the case 2 is brought into and out of the frying vessel 1 through an opening 10 which is formed in a side wall of the enclosure wall of the frying vessel 1. Located contiguously on the outer side of the opening 10 is a conveyer 11 for loading and unloading the container case body 6 into and out of the frying vessel 1. On the other hand, the lid 7 for the container case 2 is supported at the lower end of a lift rod 14a which is retractably extended into the frying vessel 1 from a lid operating mechanism 14 which is supported on a mounting plate 13 over the frying vessel enclosure. The lift rod 14a is stretched toward and away from the container case body 6 to put the lid 7 on and off the container body 6. The lid operating mechanism 14 may be of any other arrangement as long as it is capable of moving the lid 7 toward and away from the container case 2.

Fixed on the above-mentioned mounting plate 13 are lift cylinders 16 with piston rods 16a vertically movably extended into the frying vessel 1, the piston rods 16a supporting at their lower ends a case holder frame 17 which is adapted to support thereon a container body 6 of the case 2 when the latter is loaded into the frying vessel 1.

The lift cylinders 16 are connected to a fluid pressure control mechanism 18 including an electromagnetic valve and a pressure source to extend and retract the piston rods 16a toward and away from the frying oil bath to immerse the case 2 on the case holder frame 17 in the oil for a predetermined time period in a frying operation and to maintain the case holder case 17 in an upper lifted position clear of the oil surface in other phases of the operation.

The frying vessel 1 is constantly filled with a suitable quantity of oil 3 which is supplied from an oil tank 20 by an oil supply pump 19, the oil 3 being heated to a predetermined temperature by heater pipes 21 using steam as a heat source. The upper space of the frying vessel 1 is connected to a vacuum pump 24 by a suction pipe 22 via condensers 23 to reduce the pressure of the space at a predetermined reduced level during a frying operation. The condensed water which occurs as a result of cooling at the condensers 23 is collected into a tank 26 through collecting pipes 25, and successively discharged by a discharging pump 27. The number of condensers 23 may be reduced to one if desired.

In the drawings, the reference numeral 29 denotes an oil extraction port through which the oil in the frying vessel 1 is extractable, and the reference 30 denotes a lid or door which openably closes the opening 10.

With the reduced-pressure fryer apparatus of the above-described arrangement, before starting a frying operation, the piston rods 16a of the lift cylinders and the rod 14a of the lid operating mechanism 14 are all in retracted upper positions, holding the case holder frame 17 and the lid 7 in the respective upper lifted stand-by positions indicated by solid line in FIG. 1. At this time point, the container body 6 has not yet been loaded on the case holder frame 17.

In this state, the container body 6 of the container case 2, which holds a predetermined amount of food material, is transferred and delivered by the conveyer 11 and loaded through the opening 10 onto the case holder frame 17 within the frying vessel 1. Whereupon, the lid operating mechanism 14 is actuated to extend the rod 14a downward to close the lid 7 on the container body 6.

Nextly, the opening 10 is hermetically closed by the lid 30, and the pressure in the frying vessel 1 is reduced to a predetermined level (e.g., 5–30 Torr). If the oil temperature is at a predetermined level, the lift cylinders 16 are actuated by the pressure control mechanism 18 to extend the piston rods 16a downward until the case holder frame 17 is lowered to a position where the case 2 as a whole is completely immersed in the oil. The case holder frame 17 is stopped at this position for a predetermined time period to carry out a frying operation.

Figure 3:
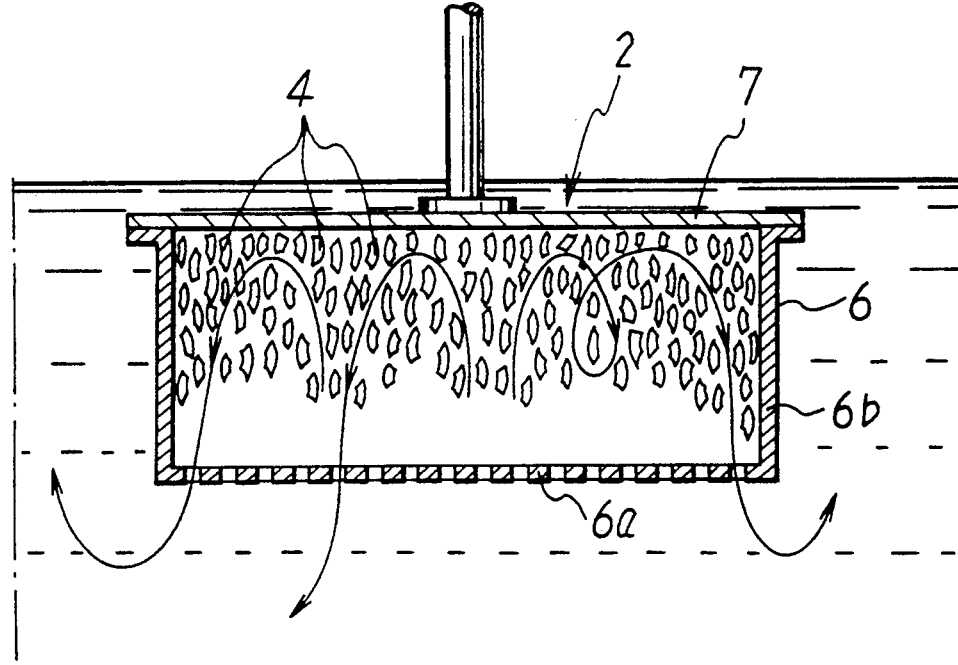
FIG. 3 is a sectional view of the food container case in a frying operation.

Upon starting a frying operation, the steam, which is released from the food material as a result of evaporation of the moisture content in the food material, climbs up within the food container case 2 as shown in FIG. 3. Since the container case 2 consists of unperforated walls on all sides except the perforated bottom side 6a, the climbing steam cannot flow out of the container case through the unperforated side walls 6b and the top side (closed with the unperforated lid 7), and as a result part of the released steam forms a steam layer over the oil surface while the remainder of the steam forms sinuous convection flows irregularly in all directions of the container case before flowing out through the perforated bottom side 6a. The steam is then discharged from the frying vessel 1 by the action of the vacuum pump 24. At this time, the steam flows provoke convectional flows of the heated oil 3 to agitate the food material in the container case. When the food material is in the form of thin chips, for example, the individual chips tend to turn into a direction in which they have the least resistance to the oil flows, namely, tend to turn into directions parallel with oil flows. Therefore, by the combined actions of the steam layer over the oil surface and the convectional flows of the heated oil 3, the food material 4, which has been softened into a relatively sticky state by heating, is suitably prevented from being pressed or stuck on the inner surface of the lid 7 or from sticking to each other to form larger lumps. In addition, the convectional oil flows contribute to make the temperature of the heated oil 3 even and to heat the food material 4 uniformly as the heated oil is uniformly distributed between and contacted with the respective pieces of the food material 4 to preclude underfrying or overfrying of the food material in certain localities of the container case.

In this manner, the convectional flows of the heated oil 3, which are spontaneously provoked by steam flows, automatically stir up the food material, so that it becomes unnecessary to shake the food container case up and down during the frying operation, namely, it suffices to hold the food container case motionless in the heated oil 3. However, the food container case may be moved up and down if desired. In such a case, however, there is no necessity for moving the food container case up and down with a large stroke as in the conventional fryer apparatus or for lifting the container case above the oil surface. As stated above, it suffices to move the food container case in the oil up and down with a small stroke which would not cause damages to the food material in the case.

Upon completing the frying operation for a predetermined time duration, the piston rods 16a of the lift cylinders 16 are retracted upward to lift the case holder frame 17 and the food container case 2 to the upper lifted positions indicated by solid line in FIG. 1. At this time, the case 2 may be stopped there for a while at the upper lifted position or if desired may be vibrated or shaken up and down in a slight degree. Besides, at the same time, the vacuum level in the frying vessel 1 is preferably increased to a higher level than in the frying operation, thereby to reduce the amount of residual oil in the fried product.

After draining off the oil, the reduced pressure prevailing in the frying vessel 1 is canceled, and the rod 14a is lifted up to open the lid 7 of the container case 2. Then, the opening 10 is uncovered to unload the container body 6 onto the conveyer 11.

As clear from the foregoing description, according to the present invention, the food material in the container case 2 is stirred in a favorable state by the steam layer and the sinuous steam flows within the case to preclude the above-mentioned sticking problems. The food material in the container case remains in a relatively sticky state only for a certain time period after starting the heating. It follows that the steam layer and the sinuous steam flows need to be maintained at least during that time period. Therefore, the lid 7 and the lateral sides 6b of the container body 6 are not necessarily required to be constituted by completely unperforated walls, and may contain a certain amount of perforations within a range which would not be impeditive to the formation of the steam layer and sinuous steam flows at least in an initial stage of heating. Namely, the lid and the side walls of the container case should be substantially unperforated within a range in which one can attain the afore-mentioned objective of the present invention.

Figure 4:
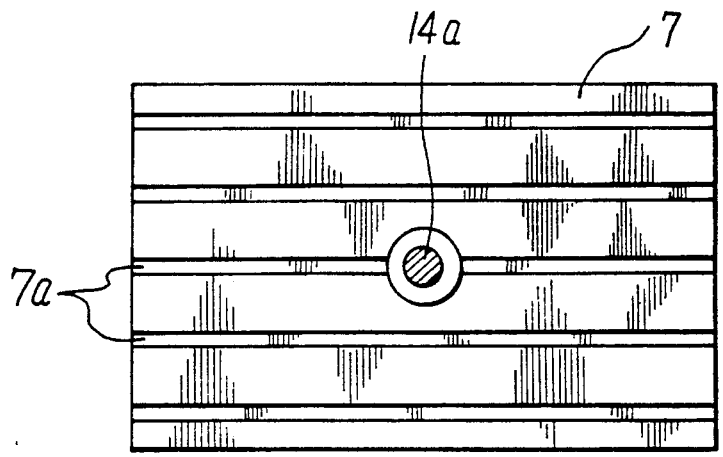
FIG. 4 is a plan view of a food container lid of a modified construction.
Figure 5:
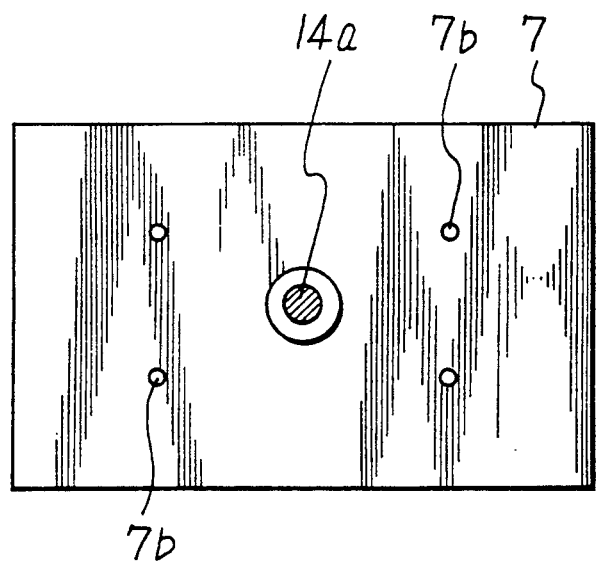
FIG. 5 is a plan view of a food container lid of another modified construction.

As shown in FIGS. 4 and 5, for the purpose of preventing formation of an oil pool or pools on the lid 7 when the food container case 2 is lifted up from the heated oil 3, the lid 7 is preferably provided with at least a groove 7a or at least a small hole 7b or a combination of a groove 7a and a small hole 7b to drip down the oil on the lid 7 therealong or therethrough. In case of the oil dripping grooves 7a, it is desirable to form each oil dripping groove 7a with a downslope gradient toward the outer edge of the lid 7. In the case of the oil dripping holes 7b, it is desirable to hold the total area of the oil dripping holes 7b within a range which would not have adverse effects on the formation of the above-mentioned steam layer and the sinuous steam flows, and normally it is desirable to provide four or five circular holes of 4 mm–5 mm in diameter at suitable positions on the lid 7. However, as to the size and shape of the oil dripping holes 7b, the present invention is not subject to any restriction because they should be determined suitably in consideration of the size of the container case 7 and the steam outflow rate. In case the lid 7 is provided with both of the oil dripping grooves 7a and the oil dripping holes 7b, it is preferable to locate the holes 7b at suitable positions within the oil dripping grooves 7a.

By providing the oil dripping grooves 7a and/or holes 7b on the lid 7 in this manner, it becomes possible to prevent the oil from lingering on the lid 7 and forming an oil pool which, when the lid 7 is opened subsequent to the frying operation and the succeeding oil drainage, would fall down to wet the fried product with the oil again. In addition, they will facilitate the job of cleaning the frying vessel 1 at the end of frying operations.

The case holder frame 17 may be arranged to hold a plural number of food container bodies. In such a case, there may be provided a plural number of lids independently for the respective container bodies on the holder frame or there may be provided a single lid of a large size which is capable of opening and closing a group of container bodies jointly.

Further, the cylinders which are employed as a lift means for the case holder frame 17 may be substituted with a motor or other lift mechanisms.

Needless to say, a food container case of cylindrical or other shape may be used in place of the rectangular container case employed in the particular embodiment shown.

Given below is an experimental example which illustrates the present invention more particularly.

EXAMPLE

Cored apples, each split into four segments, were cut into slices of sectoral shape, about 3 mm in thickness, by the use of a slicer. The apple slices were then immersed in a sugar solution of a suitably adjusted concentration, followed by recovery of the apple slices and drainage of the sugar solution.

The thus prepared food material was put in a rectangular container case which was perforated only on the bottom side, which was constituted by punching metal, and completely immersed in heated oil in a reduced-pressure frying vessel to undergo a frying treatment for 12 minutes. The oil temperature was maintained at 90° C.–95° C., and the vacuum level was maintained below 20 Torr.

Succeedingly, the case was lifted above the oil surface, and, after draining off oil in vacuum, the case was taken out of the frying vessel, followed by moderate cooling.

Observation of the fried food product in the container case unloaded from the frying vessel revealed that almost all of the sectoral chips of the fried food material were aligned along sinuous curves, each chip having its converging narrower side of the sectoral shape disposed on the lower side, presumably under the influence of the convectional oil flows.

In addition, the fried product came out in a favorable color and with almost no cracking. The taste of the fried product was pleasing one almost free of a greasy touch and at the same time free of underfried portions.

As clear from the foregoing detailed description, according to the present invention, the food container case is perforated only on the bottom side, namely, the side walls and the lid of the container case are substantially unperforated to let part of released steam, from the food material being fried, form a buffering steam layer in an upper portion of the case in prevention of violent collision of the food material against the lower surface of the container case lid while letting the remainder of the released steam form irregular sinuous flows in all directions within the case to provoke suitable convectional flows of the heated oil, thereby preventing cohesion or adhesion of the food material without vertically shaking the case during the frying operation and permitting to obtain fried food products of good quality in a reliable and facilitated manner free of cracking and underfrying.

The foregoing Example has been given for illustrative purposes only and therefore should not be construed as being limitative of the invention in any way whatsoever.

What is claimed is:

1. A reduced-pressure fryer machine of the type including a food container case adapted to hold therein food material in the form of chips, slices, sticks, cubes or other arbitrary shapes, a reduced-pressure frying vessel arranged to immerse said container case in heated oil to fry the food material under reduced pressure, and a pressure reduction means for reducing the pressure within the frying vessel, characterized in that said food container case comprises:

an open-topped box-like container body constituted by substantially unperforated walls on each side except the bottom side thereof; and
   a substantially unperforated lid adapted to cover and uncover the open top side of said container body.

2. A reduced-pressure fryer machine as defined in claim 1, wherein said lid for said container body is provided within said frying vessel and operated by means of a lid operating means to open and close the top side of said food container case in association with a case holder frame connected to a lift means to support said container case body vertically movably within said frying vessel, said food container body alone being loaded and unloaded into and out of the frying vessel through an opening in each frying operation.

3. A reduced-pressure fryer machine as defined in claim 2, wherein said lid for said food container case is provided with oil dripping grooves and/or holes on the top surface thereof.

4. A reduced-pressure fryer machine as defined in any one of claims 1 to 3, wherein said container body and lid of said food container case are provided with a coating of tetrafluoroethylene on the inner surfaces thereof.

* * * * *